July 15, 1958  R. J. PYCIAK  2,842,859
SHAFT ALIGNING GAUGE
Filed Sept. 25, 1956  2 Sheets-Sheet 1
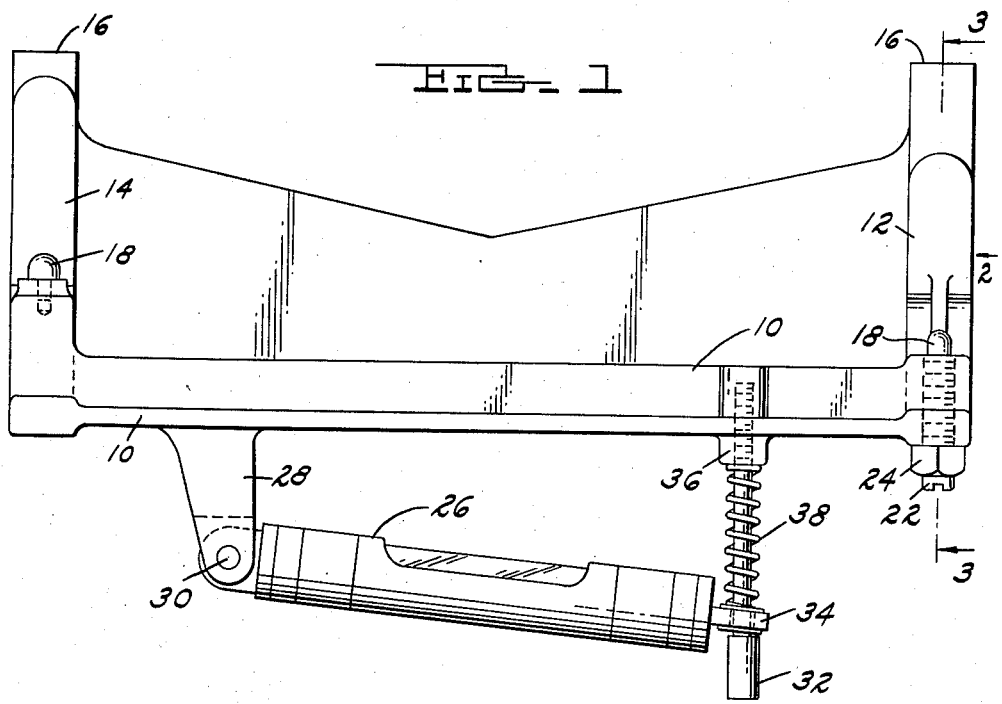
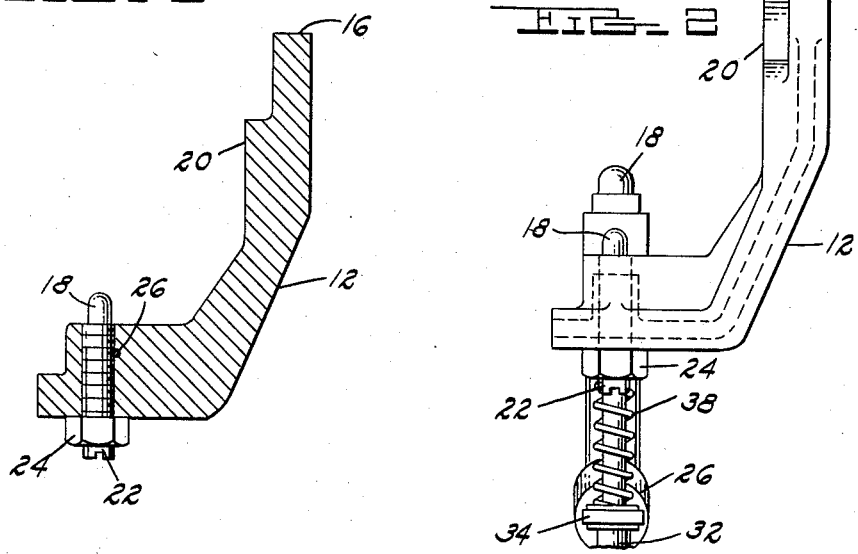
INVENTOR.
ROMAN J. PYCIAK
BY
Burton & Parker
ATTORNEYS July 15, 1958 R. J. PYCIAK 2,842,859
SHAFT ALIGNING GAUGE
Filed Sept. 25, 1956 2 Sheets-Sheet 2
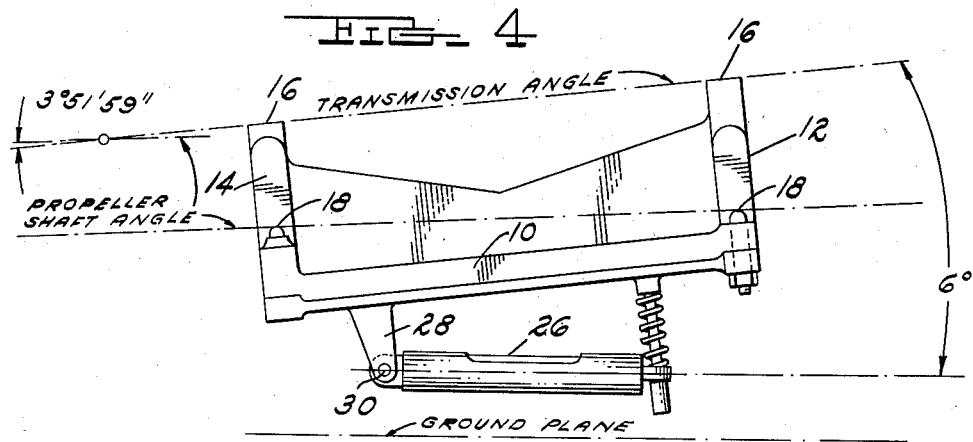
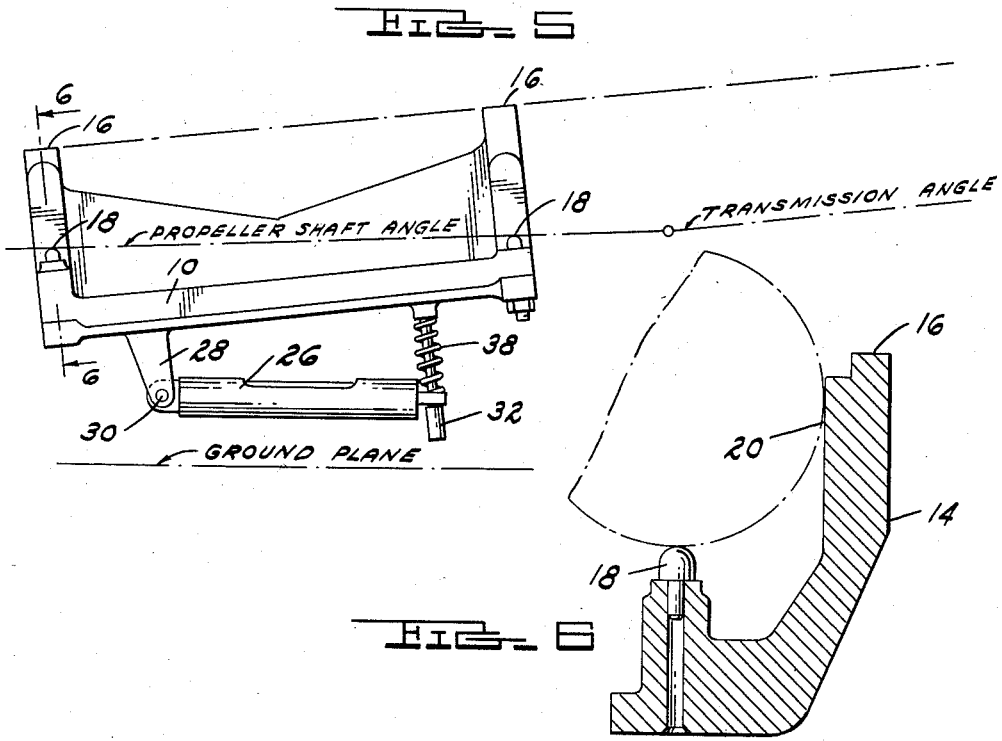
INVENTOR.
ROMAN J. PYCIAK
BY
*Burton & Parker*
ATTORNEYS

United States Patent Office 2,842,859
Patented July 15, 1958

2,842,859

SHAFT ALIGNING GAUGE

Roman J. Pyciak, Warren, Mich., assignor to Kent-Moore Organization, Inc., Warren, Mich., a corporation of Michigan Application September 25, 1956, Serial No. 611,913

6 Claims. (Cl. 33—181)

This invention relates to an improved shaft aligning gauge.

More particularly the invention relates to an improved gauge or fixture adapted to be employed to align two angularly disposed sections of a propeller shaft at a determined angle of driving alignment.

An object of the invention is to provide such a gauge or fixture adapted to be employed by a mechanic to properly relate the two sections of the drive shaft which connects the engine with the driven wheels of a motor vehicle and wherein these two sections are set at a specific and critical angle of alignment.

In one particular use for which the fixture is intended, one section of the drive shaft is disposed at approximately a 6 degree angle from the horizontal and the other section of the shaft is disposed at approximately a 4 degree angle with respect to the horizontal. Actually the relative angle of the two sections is 3° 51′ 59″. A meritorious feature of this particular fixture is that it is so designed that the mechanic can quickly determine whether the relative angle of relationship of the two sections is correct and if it is not correct, suitable adjustment can be readily made by the mechanic.

Another meritorious feature is that the gauge or aligning fixture is provided with two sets of contacts or contact faces one set of which is adapted to be brought into engagement with one section of the shaft to be aligned and the other set of which is adapted to be brought into engagement with the other section or associated part of the shaft to be aligned and means is provided to indicate whether the relative angle is correct or not.

An object is to provide a shaft aligning gauge wherein the angle is built in as to these two sets of contact means and means in the form of a spirit level is provided which is set in response to the engagement of one set of contacts with one section of the shaft and which indicates, when the other set of contacts is brought into engagement with the cooperating section of the shaft, whether the two shaft sections are properly angularly aligned.

Another meritorious feature is that the construction is such that the use of the device does not require any mathematical computation on the part of the mechanic. The proper degree of angularity is built in and when the device is applied to the parts to be aligned in use, such parts can be relatively adjusted if they are out of line without the necessity of figuring the exact amount of the misalignment.

Other objects, advantages, and meritorious features will more fully appear from the specification, claims, and accompanying drawing, wherein:

Fig. 1 is a side elevation of my improved gauge fixture;

Fig. 2 is an end elevation taken from the point of view of the arrow 2 in Fig. 1;

Fig. 3 is a vertical sectional view taken on the line 3—3 of Fig. 1;

Fig. 4 is a schematic view showing the fixture of Fig. 1 in side elevation and showing in dotted line the relative angle of two sections of the drive shaft and also showing the same with respect to the horizontal line;

Fig. 5 is a schematic view similar to Fig. 4 but with particular emphasis on the propeller shaft angle; and Fig. 6 is a cross sectional view taken on substantially the same line as Fig. 3 but showing a fragment of the propeller shaft dotted in in dotted outline.

Certain makes and models of motor vehicles are employing a two-piece drive shaft where there is a critical corollary between the angle at which the engine sets and the angle of the propeller shaft. This relative angle between the two sections of the shaft is small and in one particular make the angle is represented by 3° 51′ 59″. Such an angle is difficult for a mechanic in the shop to determine and figure with the usual protractor. The fixture of this invention has the angle built in and it is designed to quickly and easily inform the mechanic as to whether the setting is correct and if not, as to what adjustment is necessary.

The situation for the mechanic is further complicated by the fact that the adjustment is made by him with the automobile standing on a floor which floor may not be horizontal. It may slope one way or the other. The fixture is designed to take account of the different floor angles upon which a motor vehicle may stand and the fixture is such as to enable the ordinary mechanic to make his measurement and adjustment readily.

The fixture gauge comprises a frame 10 provided with L-shaped end portions 12 and 14. The configuration of such end portions is shown in Figs. 2 and 3. Each L-shaped end portion includes a long leg and a short leg. The top surface of the long leg of each end portion is indicated by the numeral 16. The two top surfaces 16 of the two long legs of the two L-shaped end portions constitute a first pair of contacts.

The short leg of each end portion is provided on its upper surface with a contact in the form of a convex button 18. These two contact buttons 18 constitute a second pair of contacts. The long leg of each L-shaped portion is also provided on its inner surface with a contact face 20. These two contact faces constitute a third pair of contacts.

The contact buttons 18 project upwardly above the top surfaces of the short legs of the L-shaped end portions as shown particularly in Figs. 2, 3, and 6. The top convex surfaces of these buttons are spaced at different heights above the plane of the bottom of the frame. The contact point 18 on the L-shaped end portion 14 is faced at a greater height from the plane of the base of the frame than the contact point 18 which is carried by the short leg of the L-shaped end portion 12, as shown particularly in Figs. 1, 2, and 4.

The contact point 18 on the L-shaped end portion 14 is an arcuate headed pin that is press-fitted into the short leg as shown. The contact point 18 on the short leg of the L-shaped end portion 12 is an arcuate headed pin that is threadedly adjustable within its short leg. Such pin has a screw kerf 22 in its lower end. It is provided with a lock nut 24 and a locking pin 26 is inserted to hold this contact member at the proper adjusted height. It is adjusted to dispose the plane established by the two contact faces 18 at the desired angular relationship with respect to the plane established by the two contact faces 16. Such adjustment is made in factory to fit the use to which the device is to be put.

The fixture carries a spirit level device in which the spirit level per se is indicated by the numeral 26. Such spirit level is supported to depend below the frame and extends generally linearly of the frame. A bracket 28 pivotally supports the spirit level at one end as at 30. A leveling screw 32 extends through an eye extension 34 at the opposite end of the spirit level and is threaded into the frame as at 36. A spring 38 encircles the leveling screw 32 so as to hold the spirit level down against the head of the screw as shown in Fig. 1. By means of this leveling screw the spirit level may be angularly adjusted toward and away from the frame or angularly with respect to a straight line drawn through the first pair of contacts.

In use the mechanic will place the contact faces 16 on the upper ends of the long legs of the two L-shaped end portions against the underside of the transmission casing. The portions of the underside of the transmission casing against which these contact faces are placed are parallel to the axis of the transmission shaft. With the gauge so held, the spirit level glass is then adjusted angularly by means of the leveling screw, and with respect to the frame until the bubble of the spirit level comes to center. In such position the spirit level is then horizontal.

The gauge is then removed from the transmission casing and the two contact buttons 18 carried by the short legs of the L-shaped portions are placed in contact with the propeller shaft. In order that these contact buttons 18 properly engage the propeller shaft, the contact faces 20 on the inner surfaces of the long legs of the L-shaped portions are brought into engagement with the side of the propeller shaft as shown in Fig. 6. If the propeller shaft and the transmission shaft occupy the proper angular position the bubble of the spirit level will again come to rest at center. If the bubble does not occupy such position, the propeller shaft is shimmed up or down to position it properly with respect to the transmission shaft.

What I claim is:

1. A shaft aligning gauge comprising a frame having two L-shaped contact carrying portions spaced apart linearly on the frame, each L-shaped portion having a long leg and a short leg, the upper ends of the two long legs constituting a first pair of contacts, the upper faces of the short legs provided with a second pair of contact, the two contacts of the first pair being so relatively arranged with respect to the two contacts of the second pair that one straight line drawn through the two contacts of the first pair bears a determinded angular relationship with respect to a second straight line drawn through the two contacts of the second pair, and a spirit level mounted upon the frame extending linearly thereof and generally in the same direction as said straight lines through said first and second pairs of contacts, said spirit level being adjustable to shift one end of the level vertically with respect to the opposite end of the level.

2. A shaft aligning gauge as defined in claim 1 characterized in that the spirit level is mounted upon the frame depending therebelow and one end of the level is pivotally supported and the opposite end of the level is shiftable to adjusted positions toward and away from the frame to vary the line of linear extension of the level angularly with respect to the straight line through the first pair of contacts.

3. A shaft aligning gauge as defined in claim 1 characterized in that a third pair of contacts is provided, one disposed upon the inner face of each long leg of each L-shaped portion above the second pair of contacts.

4. A shaft aligning gauge as defined in claim 1 characterized in that each contact face of the second pair is in the form of a convex contact button projecting upwardly above the upper face of the short leg of the L-shaped portion.

5. A shaft aligning gauge as defined in claim 1 characterized in that the contact face disposed on the upper surface of the short leg of one L-shaped portion is adjustable vertically with respect to the contact face disposed on the upper surface of the short leg of the other L-shaped portion.

6. A shaft aligning gauge comprising a frame having spaced-apart upwardly projecting L-shaped end portions, each L-shaped end portion having a long leg and a short leg the long leg of each L-shaped end portion having a contact on its top end surface, the contacts on the top end surfaces of the two long legs constituting a first pair of contacts, the short leg of each L-shaped end portion having a contact on its upper surface, said two contact faces on the short legs of the two L-shaped portions constituting a second pair of contacts and being of unequal heights above the frame, the inner surfaces of the two long legs each provided with a contact face spaced above the second contact on the short leg of said L-shaped end portion, the two contacts of the first pair of contacts being so relatively arranged with respect to the two contacts of the second pair of contacts that a straight line drawn through the contact faces of the first pair bears a determined angular relationship to a straight line drawn through the two contacts of the second pair, and a spirit level device supported upon the frame extending linearly thereof generally in the same direction as the straight lines drawn through said first and second pairs of contacts and having one end adjustable toward and away from the frame with respect to the opposite end thereof.

References Cited in the file of this patent

UNITED STATES PATENTS

| 1,544,980 | Hartsock | July 7, 1925 |
| 2,573,056 | Polinske | Oct. 30, 1951 |
| 2,620,572 | Massey | Dec. 9, 1952 |
| 2,738,589 | Jacob | Mar. 20, 1956 |
| 2,746,164 | Eitzen | May 22, 1956 |

FOREIGN PATENTS

| 489,020 | Canada | Dec. 23, 1952 |